United States Patent
Iida et al.

(10) Patent No.: US 11,891,137 B2
(45) Date of Patent: Feb. 6, 2024

(54) STEER-BY-WIRE STEERING SYSTEM

(71) Applicants: Toyota Jidosha Kabushiki Kaisha, Toyota (JP); JTEKT CORPORATION, Kariya (JP)

(72) Inventors: Tomoyuki Iida, Nisshin (JP); Masaharu Yamashita, Toyota (JP); Kenji Shibata, Nagoya (JP); Yuji Fujita, Okazaki (JP); Takashi Kodera, Okazaki (JP); Isao Namikawa, Okazaki (JP); Satoshi Matsuda, Okazaki (JP)

(73) Assignees: TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 85 days.

(21) Appl. No.: 17/518,766

(22) Filed: Nov. 4, 2021

(65) Prior Publication Data

US 2022/0153343 A1 May 19, 2022

(30) Foreign Application Priority Data

Nov. 16, 2020 (JP) .................................. 2020-190048

(51) Int. Cl.
  *B62D 5/04* (2006.01)
  *B62D 6/00* (2006.01)
  *B62D 6/04* (2006.01)

(52) U.S. Cl.
  CPC .................................. *B62D 6/008* (2013.01)

(58) Field of Classification Search
  None
  See application file for complete search history.

(56) References Cited

U.S. PATENT DOCUMENTS

| | | | |
|---|---|---|---|
| 2010/0299027 A1* | 11/2010 | Aoki | B62D 5/0484 701/42 |
| 2018/0086366 A1* | 3/2018 | Kodera | B62D 5/043 |
| 2019/0389508 A1 | 12/2019 | Varunjikar et al. | |

(Continued)

FOREIGN PATENT DOCUMENTS

| | | |
|---|---|---|
| EP | 3 702 245 A1 | 9/2020 |
| JP | 2020-083059 A | 6/2020 |

*Primary Examiner* — Adam D Tissot
*Assistant Examiner* — Laura E Linhardt
(74) *Attorney, Agent, or Firm* — Sughrue Mion, PLLC

(57) ABSTRACT

A steer-by-wire steering system for a vehicle, including: an operating device including a steering operating member, a counterforce applying mechanism configured to apply, to the steering operating member, an operation counterforce by a counterforce motor, and an operating controller configured to control the operation counterforce; a steering device including a steering actuator configured to steer a wheel by a steering motor and a steering controller configured to control an amount of steering of the wheel by the steering actuator; and a communication line communicably connecting the operating controller and the steering controller, wherein the steering controller is configured to: determine a status code based on a status of the steering device; and transmit the status code to the operating controller via the communication line; and wherein the operating controller is configured to change a magnitude of the operation counterforce in accordance with the status code received by the operating controller.

5 Claims, 9 Drawing Sheets

(56) References Cited

U.S. PATENT DOCUMENTS

| | | |
|---|---|---|
| 2020/0062298 A1 | 2/2020 | Farhat et al. |
| 2020/0164916 A1 | 5/2020 | Shibata et al. |
| 2020/0269903 A1* | 8/2020 | Anraku .................. B62D 6/04 |

* cited by examiner

STEER-BY-WIRE STEERING SYSTEM

CROSS REFERENCE TO RELATED APPLICATION

The present application claims priority to Japanese Patent Application No. 2020-190048, which was filed on Nov. 16, 2020, the disclosure of which is herein incorporated by reference in its entirety.

BACKGROUND

Technical Field

The following disclosure relates to a steer-by-wire steering system for a vehicle.

Description of Related Art

A steering system has been recently proposed in which a steering operating member such as a steering wheel and a wheel are not mechanically coupled and the wheel is steered by a steering actuator including an electric motor, without depending on an operation force by a driver. That is, a steer-by-wire steering system has been proposed. The steer-by-wire steering system typically employs a counterforce applying mechanism configured to apply an operation counterforce to the steering operating member for giving an operation feeling to the driver. For instance, a steer-by-wire steering system described in Patent Document 1 (Japanese Patent Application Publication No. 2020-83059) is configured such that, when a specific phenomenon is occurring, there is executed a control of increasing the operation counterforce applied by the counterforce applying mechanism, so as to limit the operation of the steering operating member in consideration of a load of the steering actuator.

SUMMARY

In the steering system described in Patent Document 1, a single controller executes both a control of steering of the wheel by the steering actuator and a control of the operation counterforce by the counterforce applying mechanism. In terms of simplification of the system and improvement in versatility, for instance, there has been proposed a technique of executing the two controls independently of each other by two individual controllers. In a case where the control of increasing the operation counterforce is executed in the system having the two controllers, information on various parameters relating to the steering actuator (such as a steering speed of the wheel, a supply current to the electric motor, a temperature of the electric motor, and a voltage applied from a battery) needs to be transmitted from the controller that executes the control of the steering to the controller that executes the control of the operation counterforce as a status of the steering device with respect to the specific phenomenon. This inevitably increases a load on communication in the system. Thus, a reduction in the load leads to an improvement in the utility of the steer-by-wire steering system that includes the two controllers. Accordingly, an aspect of the present disclosure is directed to a steer-by-wire steering system having high utility.

In one aspect of the present disclosure, a steer-by-wire steering system for a vehicle includes:

an operating device including a steering operating member operable by a driver, a counterforce applying mechanism configured to apply, to the steering operating member, an operation counterforce by a counterforce motor, and an operating controller configured to control the operation counterforce;

a steering device including a steering actuator configured to steer a wheel by a steering motor and a steering controller configured to control an amount of steering of the wheel by the steering actuator; and a communication line communicably connecting the operating controller and the steering controller, wherein the steering controller is configured to:
determine a status code based on a status of the steering device; and
transmit the status code to the operating controller via the communication line; and wherein the operating controller is configured to change a magnitude of the operation counterforce in accordance with the status code received by the operating controller.

In the system according to the present disclosure, the code indicating the status of the steering device is transmitted from the steering controller to the operating controller, and the operating controller that receives the code executes, based on the code, a process of changing the magnitude of the operation counterforce (hereinafter referred to as "counterforce changing process" where appropriate). Thus, the present steering system enjoys a reduction in the load on the communication.

Various Forms

In general, the operation counterforce is changed in accordance with an operation amount of the steering operating member (hereinafter simply referred to as "operating member" where appropriate). Further, the operation counterforce can be changed based on a running speed of the vehicle (hereinafter referred to as "vehicle speed" where appropriate) and an operation force applied to the operating member, for instance. The change in the operation counterforce attained by the counterforce changing process according to the present disclosure is different from such a change in the operation counterforce based on the operation amount of the operating member, the vehicle speed, or the operation force applied to the operating member, in terms of a technique for changing the operation counterforce. That is, the change in the operation counterforce attained by the counterforce changing process of the present disclosure means a change based on the status of the steering device. Thus, the change in the operation counterforce based on the operation amount or the like and the change in the operation counterforce attained by the counterforce changing process may be executed simultaneously.

The status code may be classified in accordance with a phenomenon that occurs in the steering device, for instance. For instance, the status code may be classified in accordance with an overheating phenomenon of the steering device, i.e., an overheating status of the steering motor, a low-voltage phenomenon in which a voltage applied from a power source to a drive circuit (such as an inverter) for the steering motor is dropped, and an obstacle-existing phenomenon in which the steering of the wheel is obstructed by an obstacle such as a ditch or a curb. (Such an obstacle to the steering of the wheel will be hereinafter referred to as "steering obstacle" where appropriate.) That is, the status code may be classified in accordance with a type of the phenomenon.

In a case where the status code is classified, the status code may be ranked according to the type of the phenomenon and a degree of the phenomenon (such as the temperature of the steering motor, the level of the voltage, the degree to which the steering is obstructed by the steering obstacle).

Specifically, there may be set a priority order for the status code in terms of a degree of necessity to deal with the phenomenon, a degree of urgency, a degree of importance, etc. In other words, there may be set a priority for the status code.

There may be cases in which a plurality of phenomena that are mutually different in type occur at the same time in the steering device. If the status code is ranked according to the type and degree of the phenomenon as described above, the steering controller desirably transmits the most highly ranked status code. The steering controller does not transmit a plurality of status codes but transmits only one status code, thus enabling the counterforce changing process to be simply and appropriately executed. When the status code transmitted by the steering controller changes such that ranking of the status code rises, the operating controller may execute the counterforce changing process such that an amount of change in the operation counterforce based on the status code after changing is added to an amount of change in the operation counterforce based on the status code before changing. The thus executed counterforce changing process prevents the operation counterforce from being decreased even though the ranking of the status code rises.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1:
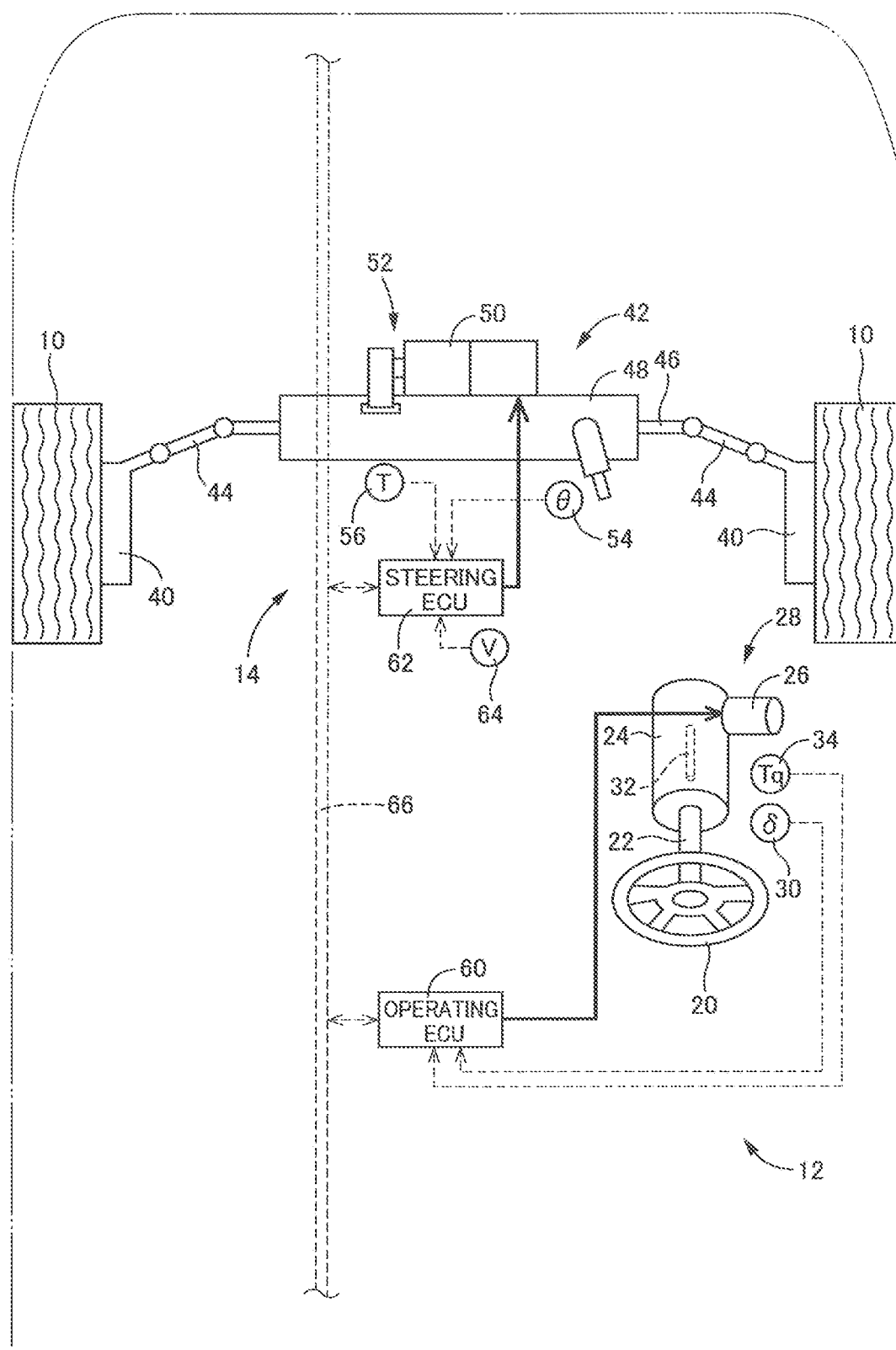
FIG. 1 is a view schematically illustrating an overall structure of a steering system according to an embodiment of the present disclosure.

Referring to the drawings, there will be explained below in detail a steering system according to one embodiment of the present disclosure. It is to be understood that the present disclosure is not limited to the details of the following embodiment, but may be embodied based on the forms described in Various Forms and may be changed and modified based on the knowledge of those skilled in the art.

A. Hardware Structure of Steering System

As schematically illustrated in FIG. 1, the steering system according to the present embodiment is installed on a vehicle to steer two wheels 10 of the vehicle. The two wheels 10 are steerable wheels. The present steering system is of a steer-by-wire type, i.e., a steer-by-wire steering system, including an operating device 12 and a steering device 14 that are mechanically independent of each other.

The operating device 12 includes a) a steering wheel 20 (as a steering operating member) operable by a driver to steer the wheels 10, b) a steering shaft 22 to one end of which is attached the steering wheel 20, c) a steering column 24 that rotatably holds the steering shaft 22 and that is supported by an instrument panel reinforcement (not illustrated), and d) a counterforce applying mechanism 28 that utilizes, as a power source, a counterforce motor 26 (that is an electric motor supported by the steering column 24) for applying a counterforce $F_{CT}$ against a steering operation with respect to the steering wheel 20 via the steering shaft 22. Though the counterforce is a counter torque in a strict sense, a commonly used term "operation counterforce" will be hereinafter used. The counterforce applying mechanism 28 has an ordinary structure including a speed reducer, etc., and a detailed explanation thereof is dispensed with.

The operating device 12 includes an operation angle sensor 30 for detecting an operation angle S of the steering wheel 20 as a steering operation amount. Here, a posture of the steering wheel 20 in a straight running state of the vehicle is defined as a neutral posture. In this case, a rotation angle of the steering wheel 20 from the neutral position is the operation angle δ of the steering wheel 20. A torsion bar 32 is incorporated in the steering shaft 22. The operating device 12 includes an operation torque sensor 34 for detecting an operation torque Tq based on a torsional amount of the torsion bar 32. The operation torque Tq is an operation force applied to the steering wheel 20 by the driver.

The wheels 10 are supported by a body of the vehicle via respective steering knuckles 40 such that the wheels 10 are steerable or turnable. The steering device 14 rotates the steering knuckles 40 to thereby steer the wheels 10 together. The steering device 14 includes a steering actuator 42 as a main constituent element. The steering actuator 42 includes a) a steering rod 46 whose opposite ends are connected to the right and left steering knuckles 40 via respective link rods 44, b) a housing 48 fixedly supported by the vehicle body and supporting the steering rod 46 movably in the right-left direction, and c) a rod moving mechanism 52 that utilizes, as a drive source, a steering motor 50 (that is an electric motor) for moving the steering rod 46 in the right-left direction. The rod moving mechanism 52 is constituted principally by a ball screw mechanism including a ball groove formed in the steering rod 46 and a nut that is in engagement with the ball groove via bearing balls and that is rotated by the steering motor 50. The rod moving mechanism 52 has an ordinary structure, and a detailed explanation thereof is dispensed with.

The steering device 14 includes a steering angle sensor 54 that detects an amount of movement of the steering rod 46 from its neutral position (that is a position of the steering rod 46 in the straight running state of the vehicle) to thereby detect a steering angle θ as an amount of steering of the wheels 10, i.e., a steering amount. Further, a temperature sensor 56 is provided on the housing 48 of the steering actuator 42 for detecting a temperature in the vicinity of the steering motor 50. This temperature will be hereinafter referred to as "motor temperature" for convenience sake.

The control of the operating device 12, in other words, the control of the operation counterforce $F_{CT}$, namely, the control of the counterforce motor 26, is executed by an operating electronic control unit (hereinafter referred to as "operating ECU" where appropriate) 60 as an operating controller that is a controller for the operating device 12. The operating ECU 60 is constituted by a computer including a CPU, a ROM, a RAM, etc., and a drive circuit for the counterforce motor 26, for instance. Specifically, the drive circuit is an inverter because the counterforce motor 26 is a three-phase brushless motor.

Similarly, the control of the steering device 14, in other words, the control of the steering angle θ, namely, the control of the steering motor 50, is executed by a steering electronic control unit (hereinafter referred to as "steering ECU" where appropriate) 62 as a steering controller that is a controller for the steering device 14. The steering ECU 62 is constituted by a computer including a CPU, a ROM, a RAM, etc., and a drive circuit for the steering motor 50, for instance. Specifically, the drive circuit is an inverter because the steering motor 50 is a three-phase brushless motor. The steering ECU 62 includes a voltage sensor 64 for detecting a voltage (hereinafter referred to as "application voltage" where appropriate) V applied from a battery to the steering ECU 62 for supplying an electric current to the steering motor 50, namely, for detecting a voltage V of the battery.

As later explained in detail, the operating ECU 60 and the steering ECU 62 execute respective control processes while transmitting and receiving information to and from each other. To this end, the operating ECU 60 and the steering ECU 62 are connected to a CAN (car area network or controllable area network) 66 as a communication line.

B. Control of Steering System

In the steering system according to the present embodiment, there are executed, as in ordinary steer-by-wire steering systems, a steering control of the wheels based on the steering operation with respect to the steering wheel 20 (hereinafter simply referred to as "steering control" where appropriate) and a control of the operation counterforce (hereinafter simply referred to as "counterforce control" where appropriate). In the steering system according to the present embodiment, there is further executed a process of changing a magnitude of the operation counterforce based on a status of the steering device 14 (hereinafter referred to as "counterforce changing process" where appropriate). Hereinafter, the steering control, a basic counterforce control, and the counterforce changing process will be explained in this order, and a flow of each control will be briefly explained thereafter.

(a) Steering Control

The steering control is a control for attaining steering of the wheels 10 that corresponds to the steering operation with respect to the steering wheel 20. The operating ECU 60 detects the operation angle S of the steering wheel 20 via the operation angle sensor 30 and determines a target steering angle θ* as a target of the steering angle θ of the wheels 10 by multiplying the detected the operation angle δ by a steering gear ratio $R_G$ set in advance, according to the following expression:

$$\theta^* = R_G \times \delta$$

The operating ECU 60 transmits information on the determined target steering angle θ* to the steering ECU 62 via the CAN 66.

The steering ECU 62 receives the information on the target steering angle θ* and detects, via the steering angle sensor 54, an actual steering angle θ of the wheels 10 (hereinafter referred to as "actual steering angle θ" where appropriate). The steering ECU 62 determines a deviation of the actual steering angle θ with respect to the target steering angle θ*, i.e., a steering angle deviation Δθ, according to the following expression:

$$\Delta\theta = \theta^* - \theta$$

The steering ECU 62 determines an electric current $I_s$ to be supplied to the steering motor 50 (hereinafter referred to as "supply current $I_S$" where appropriate) according to a feedback control law based on the steering angle deviation Δθ, namely, according to the following expression. In this respect, the first term, the second term, and the third term in the following expression are a proportional term, an integral term, and a derivative term, respectively, and "$G_P$", "$G_I$", and "$G_D$" in the following expression are a proportional term gain, an integral term gain, and a derivative term gain, respectively.

$$I_S = G_P \times \Delta\theta + G_I \times \int \Delta\theta dt + G_D \times d\Delta\theta/dt$$

The steering ECU 62 supplies the determined supply current $I_S$ to the steering motor 50.

(b) Basic Counterforce Control

The counterforce control is a control for giving, to the driver, an operation feeling with respect to the steering operation. In the basic counterforce control, the operating ECU 60 determines the operation counterforce $F_{CT}$ based on two components, i.e., a steering-force-dependent component $F_S$ and an assist-dependent reduction component $F_A$, according to the following expression:

$$F_{CT} = F_S - F_A$$

The steering-force-dependent component $F_S$ is a component relating to the steering force necessary for steering the wheels 10. The steering-force-dependent component $F_S$ is determined according to the following expression:

$$F_S = f_{SA}(\delta, v) + f_F(d\delta, v)$$

In the above expression, the first term "$f_{SA}(\delta, v)$" is a self-aligning-dependent function using, as parameters, the operation angle δ of the steering wheel 20 and the vehicle speed v. The first term "$f_{SA}(\delta, v)$" may be considered as a component based on a self-aligning torque that acts on the wheels 10. According to the self-aligning-dependent function $f_{SA}(\delta, v)$, the steering-force-dependent component $F_S$ is determined so as to be increased with an increase in the vehicle speed v and so as to be increased with an increase in the operation angle δ.

In the above expression, the second term "$f_F(d\delta, v)$" is a road-surface-friction-dependent function using, as parameters, an operating speed dδ that is a rate of change of the operation angle δ and the vehicle speed v. The second term "$f_F(d\delta, v)$" may be considered as a component based on a force that acts on the wheels 10 due to the friction with the road surface on which the wheels 10 are traveling. According to the road-surface-friction-dependent function $f_F(d\delta, v)$, the steering-force-dependent component $F_S$ is determined so as to be increased with a decrease in the vehicle speed v and so as to be increased with an increase in the operating speed dδ, in consideration of what is called stationary steering, for instance.

The determination of the steering-force-dependent component $F_S$ in the basic counterforce control is well known in the art, and a detailed explanation thereof is dispensed with. The vehicle speed v is determined by a brake ECU (not illustrated) that is an electronic control unit for a brake system based on wheel rotation speeds detected by wheel speed sensors provided for the respective wheels 10. The brake ECU is also connected to the CAN 66. The operating ECU 60 obtains the vehicle speed v based on information transmitted from the brake ECU via the CAN 66. Further, the operating ECU 60 identifies the operating speed dδ based on a change in the detected operation angle δ.

The assist-dependent reduction component $F_A$ may be considered as a component for giving, to the driver, an operation feeling of what is called power steering. In the power steering, an assist torque corresponding to the operation torque Tq is applied to the steering shaft 22. The assist-dependent reduction component $F_A$ is determined according to the following expression so as to simulate the assist torque:

$$F_A = f_T(Tq)$$

Figure 2A:
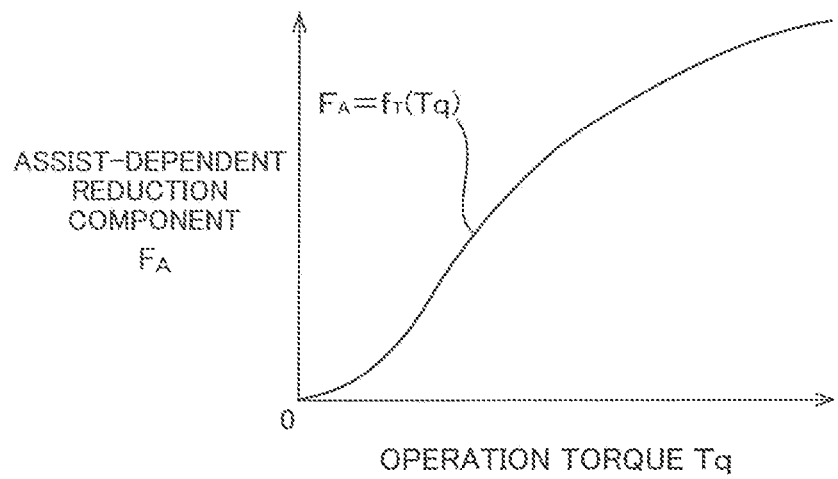
FIG. 2A is a graph representing a relationship between an assist-dependent reduction component as one component of an operation counterforce and an operation torque applied to a steering operating member.

In the above expression, "$f_T(Tq)$" is an assist function using the operation torque Tq as a parameter. According to the assist function, the assist-dependent reduction component is determined so as to be increased with an increase in the operation torque Tq. Schematically, the assist-dependent reduction component is determined based on the operation torque Tq as illustrated in a graph of FIG. 2A.

The determination of the steering-force-dependent component $F_S$ in the basic counterforce control is well known in the art, and a detailed explanation thereof is dispensed with. The operating ECU 60 detects the operation torque Tq via the operation torque sensor 34.

Based on the thus determined operation counterforce $F_{CT}$, the operating ECU 60 determines an electric current $I_C$ to be supplied to the counterforce motor 26 according to the following expression and supplies the determined electric current $I_C$ to the counterforce motor 26. In the following expression, "α" is a current determination coefficient set in advance:

$$I_C = \alpha \times F_{CT}$$

In the basic counterforce control explained above, the operating ECU 60 can appropriately control the operation counterforce $F_{CT}$ without receiving information from the steering device 14 via the CAN 66, thus achieving a control that does not impose a heavy load on communication between the operating device 12 and the steering device 14.

(c) Counterforce Changing Process i) Significance of Counterforce Changing Process In the steer-by-wire steering system, the operation counterforce $F_{CT}$ has a role of giving an appropriate operation feeling to the driver. It is possible to assign another function to the operation counterforce $F_{CT}$. Specifically, in a case where the steering actuator 42, namely, the steering motor 50 in particular, overheats, it is desired to limit the output of the steering motor 50, namely, it is desired to limit the steering of the wheels 10, for protecting the steering motor 50. Further, in a case where the voltage of the battery as a power source for supplying the electric current to the steering motor 50 is dropped, namely, the voltage applied to the steering ECU 62 (hereinafter referred to as "application voltage" where appropriate) V is dropped, it is desired to limit the steering of the wheels 10 for reducing a load of the steering actuator 42. Moreover, in a case where the steering of the wheels 10 is obstructed due to an obstacle such as a curb or a ditch, it is needed to let the driver aware of the existence of the obstacle. For limiting the steering of the wheels 10 and for letting the driver aware of the obstacle, the operation counterforce $F_{CT}$ may be changed, specifically, the operation counterforce $F_{CT}$ may be increased, from the magnitude thereof generated in the basic counterforce control. That is, the counterforce changing process allows the operation counterforce $F_{CT}$ to have a function of imposing the limitation of the steering on the driver based on the status of the steering device 14 and a function of letting the driver aware of the obstacle to the steering based on the status of the steering device 14.

ii) Load on Communication

The counterforce changing process that has been conventionally proposed is executed based on the detected motor temperature T of steering motor 50, the detected application voltage V, the detected steering speed dθ that is a rate of change of the steering angle θ, the detected supply current $I_S$ to the steering motor 50, etc. If such a counterforce changing process is executed in the steering system of the present embodiment, it is usual for the steering ECU 62 to detect the motor temperature T, the application voltage V, the steering speed dθ, and the supply current $I_S$ while it is usual for the operating ECU 60 to execute the counterforce changing process. That is, it is needed to transmit, whenever necessary, information on the detected motor temperature T, application voltage V, steering speed dθ, and supply current $I_S$ from the steering ECU 62 to the operating ECU 60 via the CAN 66 that is the communication line. The transmission and reception of an enormous amount of information places a communication load on the system, undesirably causing a delay in the control of the steering system or a trouble in the control of other systems connected to the CAN 66.

iii) Coding Status of Steering Device

In view of the communication load described above, the steering ECU 62 of the steering system of the present embodiment codes the status of the steering device 14 based on the motor temperature T, the application voltage V, the steering speed dθ, and the supply current $I_S$ and transmits a single status code to the operating ECU 60 via the CAN 66. The operating ECU 60 changes the operation counterforce $F_{CT}$ based on the status code transmitted thereto according to a predetermined rule.

Examples of the status code are indicated in the table 1 below. The status code is classified in accordance with a phenomenon that occurs in the steering device 14 and is ranked according to a type and a degree of the phenomenon. Here, the degree of the phenomenon may be considered as a degree of a symptom. In other words, there is set, for the status code, a priority order in terms of a degree of necessity to deal with the phenomenon, a degree of urgency, and a degree of importance of dealing with the phenomenon.

TABLE 1

| Status Code | Type of Phenomenon | Degree of Phenomenon |
|---|---|---|
| 0 | normal | — |
| 1L | overheating | light |
| 1M | overheating | moderate |
| 1H | overheating | severe |
| 2L | low voltage | light |
| 2M | low voltage | moderate |

TABLE 1-continued

| Status Code | Type of Phenomenon | Degree of Phenomenon |
| --- | --- | --- |
| 2H | low voltage | severe |
| 3L | obstacle existing | light |
| 3H | obstacle existing | severe |

The type of the target phenomenon for the counterforce changing process includes an overheating status (first class) in which the motor temperature T is high, a low-voltage status (second class) in which the application voltage V is low, and an obstacle-existing status (third class) in which the obstacle to the steering, i.e., the steering obstacle, exists. A status in which no target phenomenon is occurring in the steering device 14 is a normal status. The status code representing the normal status is "0", the status code representing the overheating status is "1*", the status code representing the low-voltage status is "2*", and the status code representing the obstacle-existing status is "3*". (The sign "*" indicates a certain degree of the phenomenon.) In the status code, the degree of the phenomenon is indicated as follows. That is, a light degree is indicated by "*L", a moderate degree is indicated by "*M", and a severe degree is indicated by "*H". (The sign "*" indicates a certain type of the phenomenon.)

The status code is set such that ranking thereof rises toward the bottom of the table. In the present embodiment, nine kinds of the status code are set. In ascending order of the ranking, the nine kinds of the status code are a normal status "0", a light overheating status "1L", a moderate overheating status "1M", a severe overheating status "1H", a light low-voltage status "2L", a moderate low-voltage status "2M", a severe low-voltage status "2M", a light obstacle-existing status "3L", and a severe obstacle-existing status "3H".

The steering ECU 62 identifies a current status of the steering device 14 based on the motor temperature T, the application voltage V, the steering speed dθ, and the supply current $I_S$ so as to determine the status code. Specifically, when the motor temperature T detected via the temperature sensor 56 is higher than a light threshold temperature $T_L$, and not higher than a moderate threshold temperature $T_M$, the status code is determined to be the light overheating status "1L". When the motor temperature T is higher than the moderate threshold temperature $T_M$ and not higher than a severe threshold temperature $T_H$, the status code is determined to be the moderate overheating status "1M". When the motor temperature T is higher than the severe threshold temperature $T_H$, the status code is determined to be the severe overheating status "1H". When the application voltage V detected via the voltage sensor 64 is lower than a light threshold voltage $V_L$ and not lower than a moderate threshold voltage $V_M$, the status code is determined to be the light low-voltage status "2L". When the application voltage V is lower than the moderate threshold voltage $V_M$ and not lower than a severe threshold voltage $V_H$, the status code is determined to be the moderate low-voltage status "2M". When the application voltage V is lower than the severe threshold voltage $V_H$, the status code is determined to be the severe low-voltage status "2H". In a situation in which the steering speed dθ is lower than a threshold speed $dθ_{TH}$, namely, in a situation in which the steering angle θ can be regarded as not substantially changing, the status code is determined to be the light obstacle-existing status "3L" when the supply current $I_S$ to the steering motor 50 is larger than a light threshold current $I_S$, and not larger than a severe threshold current Isi while the status code is determined to be the severe obstacle-existing status "3H" when the supply current $I_S$ is larger than the severe threshold current $I_{SH}$.

The steering device 14 may sometimes be in a status in which two or more status codes are determined. From the viewpoint of reducing the communication load, even if two or more status codes are determined, the steering ECU 62 determines, as the status code at the present time point, only the most highly ranked one of the two or more status codes, namely, the steering ECU 62 determines only one status code whose ranking is the highest among the two or more status codes. The steering ECU 62 transmits information on the determined one status code to the operating ECU 60. Hereinafter, the transmission and reception of the information on the status code will be simply referred to as "transmission and reception of the status code" where appropriate.

iv) Changing Operation Counterforce Based on Status Code

The operating ECU 60 changes, in accordance with the status code, the operation counterforce $F_{CT}$ determined in the basic counterforce control. In other words, the operating ECU 60 determines the operation counterforce $F_{CT}$ such that the operation counterforce $F_{CT}$ determined in the basic counterforce control is shifted by an amount corresponding to the status code.

Figure 2B:
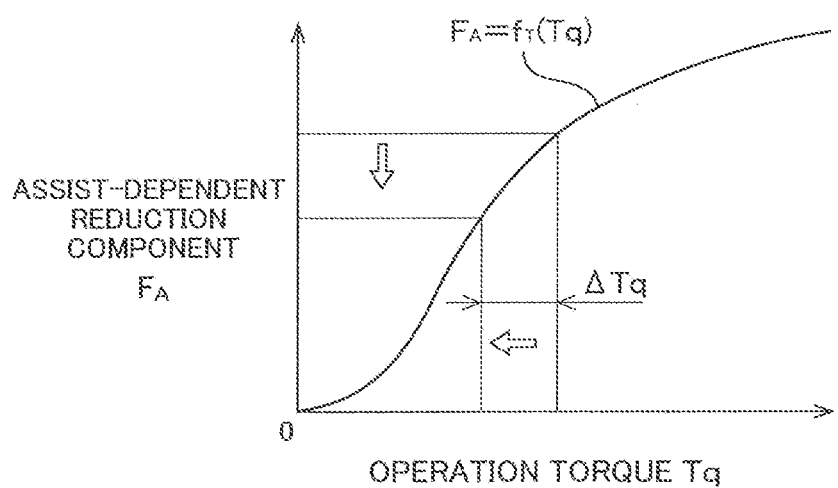
FIG. 2B is a graph representing another relationship between the assist-dependent reduction component and the operation torque.

Specifically, when the transmitted status code indicates the overheating status, the operating ECU 60 executes a first-class process in which the assist-dependent reduction component $F_A$ in the basic counterforce control is decreased, so as to increase the operation counterforce $F_{CT}$. As described above, the assist-dependent reduction component $F_A$ is determined in the normal state according to the assist function $f_T(Tq)$ illustrated in FIG. 2A. In contrast, the operating ECU 60 determines the assist-dependent reduction component $F_A$ in the overheating status according to the assist function $f_T(Tq-\Delta Tq)$ as illustrated in FIG. 2B which uses, as a parameter, a value obtained by subtracting the reduction torque $\Delta Tq$ from the operation torque Tq. The operation torque Tq as the parameter is decreased, and the assist-dependent reduction component $F_A$ is accordingly decreased. Consequently, the operation counterforce $F_{CT}$ is increased. Further, the reduction torque $\Delta Tq$ is determined to be a value that differs in accordance with the degree of the overheating status. Specifically, when the status code is the light overheating status "1L", the operating ECU 60 determines the reduction torque $\Delta Tq$ to be a light-status torque $\Delta Tq_L$. When the status code is the moderate overheating status "1M", the operating ECU 60 determines the reduction torque $\Delta Tq$ to be a moderate-status torque $\Delta Tq_M$ larger than the light-status torque $\Delta Tq_L$. When the status code is the severe overheating status "1H", the operating ECU 60 determines the reduction torque $\Delta Tq$ to be a severe-status torque $\Delta Tq_H$ larger than the moderate-status torque $\Delta Tq_M$. That is, the assist-dependent reduction component $F_A$ is decreased with an increase in the degree of the overheating status to thereby increase the operation counterforce $F_{CT}$.

Figure 2C:
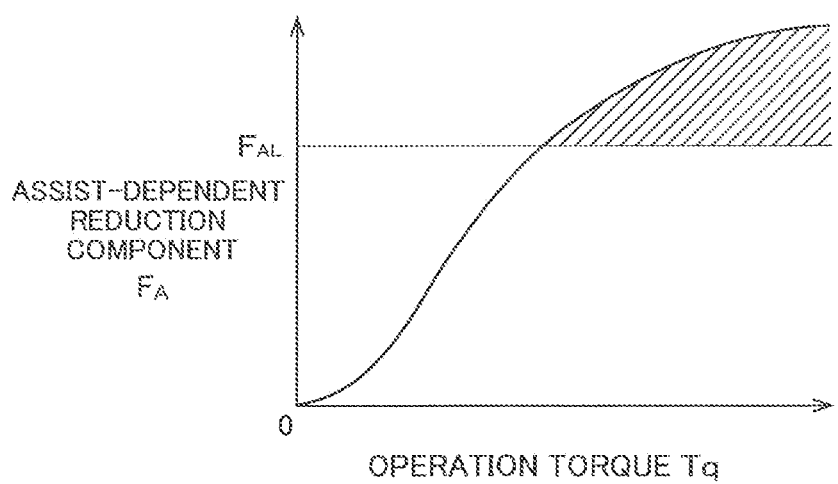
FIG. 2C is a graph representing still another relationship between the assist-dependent reduction component and the operation torque.

When the transmitted status code indicates the low-voltage status, the operating ECU 60 executes a second-class process in which an upper limit is set for the assist-dependent reduction component $F_A$ in the basic counterforce control, so as to increase the operation counterforce $F_{CT}$. Specifically, when the assist-dependent reduction component $F_A$ determined in the basic counterforce control exceeds an upper limit value $F_{AL}$ as illustrated in FIG. 2C, the operating ECU 60 determines the assist-dependent reduction component $F_A$ to be equal to the upper limit value FA. The assist-dependent reduction component $F_A$ is thus limited, so that the assist-dependent reduction component $F_A$ is decreased within a range in which the assist-dependent reduction component $F_A$ is limited. As a result, the operation counterforce $F_{CT}$ is increased. Further, the upper limit value $F_{AL}$ is determined to be a value that differs in accordance with the degree of the low-voltage status. Specifically, when the status code is the light low-voltage status "2L", the operating ECU 60 determines the upper limit value $F_{AL}$ to be a light-status upper limit value $F_{ALL}$. When the status code is the moderate low-voltage status "2M", the operating ECU 60 determines the upper limit value $F_{AL}$ to be a moderate-status upper limit value $F_{ALM}$ smaller than the light-status upper limit value $F_{ALL}$. When the status code is the severe low-voltage status "2H", the operating ECU 60 determines the upper limit value $F_A$ to be a severe-status upper limit value $F_{ALH}$ smaller than the moderate-status upper limit value $F_{ALM}$. That is, the assist-dependent reduction component $F_A$ is limited to a higher extent with an increase in the degree of the low-voltage status to thereby increase the operation counterforce $F_{CT}$ in accordance with the limited assist-dependent reduction component $F_A$.

When the transmitted status code indicates the obstacle-existing status, the operating ECU 60 executes a third-class process in which an obstacle-dependent component $F_B$ is added to the operation counterforce $F_{CT}$ determined in the basic counterforce control to thereby increase the operation counterforce $F_{CT}$. That is, the operation counterforce $F_{CT}$ is determined according to the following expression:

$$F_{CT}=F_S-F_A+F_B$$

The obstacle-dependent component $F_B$ is determined to be a value that differs in accordance with the degree of the obstacle-existing status. Specifically, when the status code is the light obstacle-existing status "3L", the operating ECU 60 determines the obstacle-dependent component $F_B$ to be a light-status component $F_{BL}$. When the status code is the severe obstacle-existing status "3H", the operating ECU 60 determines the obstacle-dependent component $F_B$ to be a severe-status component $F_{BH}$ larger than the light-status component $F_{BL}$. That is, the obstacle-dependent component $F_B$ to be added is increased with an increase in the degree of the obstacle-existing status to thereby increase the operation counterforce $F_{CT}$.

As explained above, the steering device 14 may sometimes be in a status in which two or more mutually different status codes are determined. Even in such a status, the steering ECU 62 transmits, to the operating ECU 60, only the most highly ranked one of the two or more mutually different status codes. Accordingly, even though the status code transmitted to the operating ECU 60 changes to another status code that is ranked higher, there may be a possibility that the operation counterforce $F_{CT}$ is undesirably decreased.

In the present steering system, therefore, in a situation in which the status code changes to another status code that differs in the type of the phenomenon, the operation counterforce $F_{CT}$ is prevented from being decreased when the change of the status code involves a rise in the ranking. Specifically, the operating ECU 60 stores a value of the reduction torque $\Delta Tq$ and a value of the upper limit value $F_{AL}$ for determining the assist-dependent reduction component $F_A$ respectively as a previous value $\Delta Tq_{PR}$ and a previous value $F_{ALPR}$. In a case where the status code is changed from the overheating status "1*" to the low-voltage status "2*" or the obstacle-existing status "3*", the operating ECU 60 maintains the reduction torque $\Delta Tq$ at the previous value $\Delta Tq_{PR}$. In a case where the status code is changed from the low-voltage status "2*" to the obstacle-existing status "3*", the operating ECU 60 maintains the upper limit value $F_{AL}$ at the previous value $F_{ALPR}$. This configuration prevents a decrease in the operation counterforce $F_{CT}$ due to the change of the status code involving a rise in ranking.

C. Control Flows in Steering System

Figure 3:
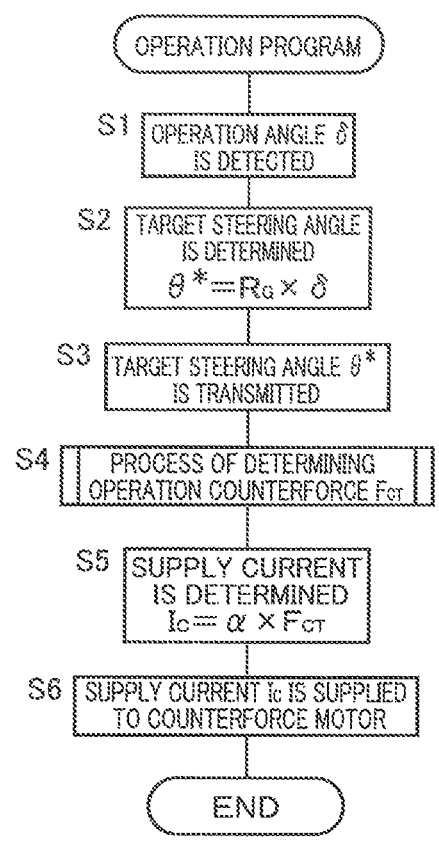
FIG. 3 is a flowchart representing an operation program executed in the steering system according to the embodiment.
Figure 4:
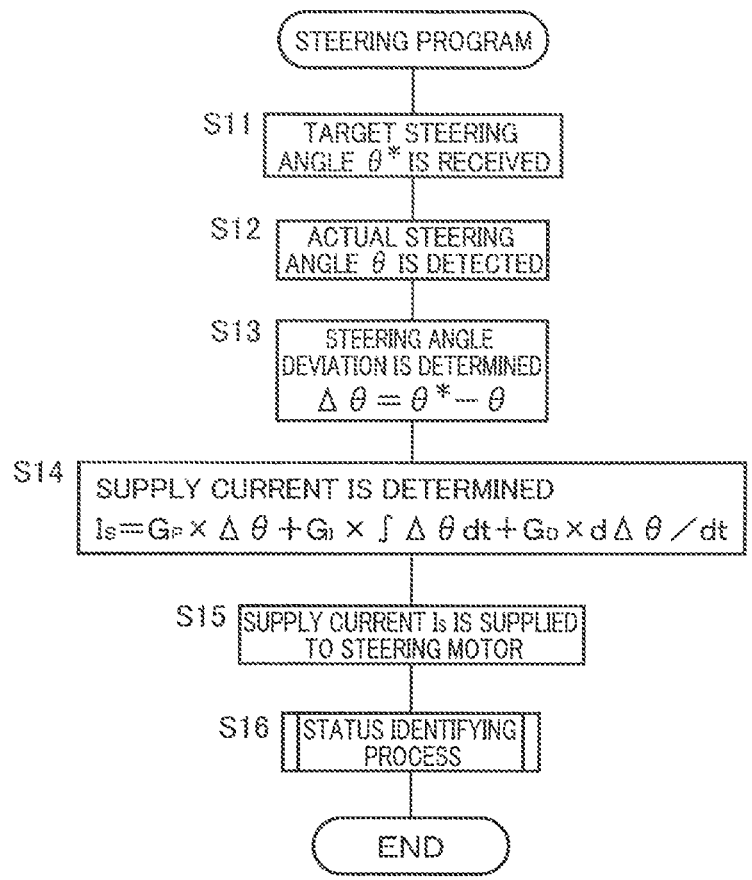
FIG. 4 is a flowchart representing a steering program executed in the steering system according to the embodiment.

In the steering system, the operating ECU 60 repeatedly executes an operation program represented by a flowchart of FIG. 3, and the steering ECU 62 repeatedly executes a steering program represented by a flowchart of FIG. 4, each at a short time pitch, e.g., from several to several tens of milliseconds (msec), so that the steering control, the basic counterforce control, and the counterforce changing process are executed. There will be hereinafter explained processes according to the programs to briefly explain control flows in the present steering system, namely, a flow of the steering control, a flow of the basic counterforce control, and a flow of the counterforce changing process.

In the process according to the operation program, the operation angle δ of the steering wheel 20 is detected at Step 1 via the operation angle sensor 30. (Hereinafter, "Step 1" will be abbreviated as "S1". Other steps will be similarly abbreviated.) At S2, the target steering angle θ* is determined by multiplying the detected operation angle δ by a predetermined steering gear ratio $R_G$. At S3, information on the target steering angle θ* is transmitted to the steering ECU 62.

At S4, a process of determining the operation counterforce $F_{CT}$ (hereinafter referred to as "operation-counterforce determining process" where appropriate) is executed. The operation-counterforce determining process will be later explained in detail. After the operation-counterforce determining process, the control flow proceeds to S5 at which the supply current $I_C$ to the counterforce motor 26 is determined by multiplying the determined operation counterforce $F_{CT}$ by a predetermined current determination coefficient α. At S6, the supply current $I_C$ is supplied to the counterforce motor 26.

The process according to the steering program starts with S11 at which information on the target steering angle θ* transmitted from the operating ECU 60 is received. At S12, the actual steering angle θ, which is an actual steering angle of the wheels 10, is detected via the steering angle sensor 54. At S13, the steering angle deviation Δθ is determined by subtracting the detected actual steering angle θ from the received target steering angle θ*. At S14, the supply current $I_S$ to the steering motor 50 is determined by the technique according to the feedback control law based on the steering angle deviation Δθ. At S15, the supply current $I_S$ is supplied to the steering motor 50.

Figure 5:
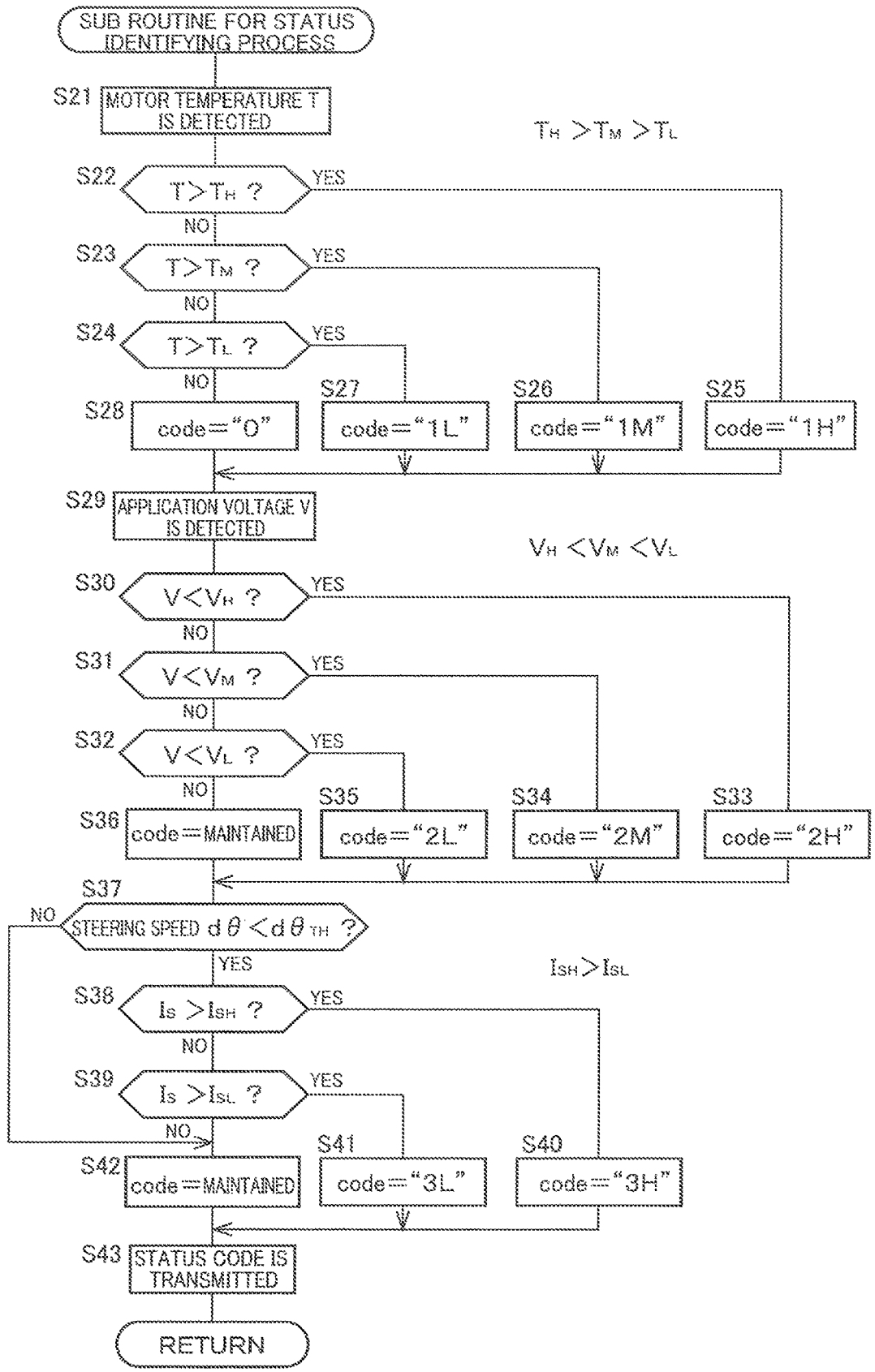
FIG. 5 is a flowchart representing a sub routine for a status identifying process executed in the steering program.

At S16, a status identifying process of identifying the status of the steering device 14 is executed. The status identifying process is executed by executing a sub routine for the status identifying process represented by a flowchart of FIG. 5.

In the process according to the sub routine for the status identifying process, the motor temperature T, which is the temperature in the vicinity of the steering motor 50, is detected via the temperature sensor 56 at S21. The detected motor temperature T is compared with the light threshold temperature $T_L$, the moderate threshold temperature $T_M$, and the severe threshold temperature $T_H$ respectively at S22, S23, and S24. When the motor temperature T is higher than the severe threshold temperature $T_H$, the status code is determined to be "1H" at S25. When the motor temperature T is higher than the moderate threshold temperature $T_M$ and not higher than the severe threshold temperature $T_H$, the status code is determined to be "1M" at S26. When the motor temperature T is higher than the light threshold temperature $T_L$ and not higher than the moderate threshold temperature $T_M$, the status code is determined to be "1L" at S27. When the motor temperature T is not higher than the light threshold temperature $T_L$, the status code is determined to be "0" at S28.

At S29, the application voltage V, which is the voltage of the battery applied to the steering ECU 62, is detected via the voltage sensor 64. The detected application voltage V is compared with the light threshold voltage $V_L$, the moderate threshold voltage $V_M$, and the severe threshold voltage $V_H$, respectively at S30, S31, and S32. When the application voltage V is lower than the severe threshold voltage $V_H$, the status code is changed to "2H" at S33. When the application voltage V is lower than the moderate threshold voltage $V_M$ and not lower than the severe threshold voltage $V_H$, the status code is changed to "2M" at S34. When the application voltage V is lower than the light threshold voltage $V_L$ and not lower than the moderate threshold voltage $V_M$, the status code is changed to "2L" at S35. When the application voltage V is not lower than the light threshold voltage $V_L$, the status code that is already determined is maintained at S36.

At S37, the steering speed $d\theta$ is identified based on a change of the actual steering angle $\theta$, and it is determined whether the steering speed $d\theta$ is lower than the threshold speed $d\theta_{TH}$, in other words, whether the wheels 10 are substantially being steered. When the steering speed $d\theta$ is lower than the threshold speed $d\theta_{TH}$, the already determined supply current $I_S$ to the steering motor 50 is compared with the severe threshold current $I_{SH}$ and the light threshold current $I_{SL}$ respectively at S38 and S39. When the supply current $I_S$ is larger than the severe threshold current $I_{SH}$, the status code is changed to "3H" at S40. When the supply current $I_S$ is larger than the light threshold current $I_{SL}$ and not larger than the severe threshold current $I_{SH}$, the status code is changed to "3L" at S41. When the supply current $I_S$ is not larger than the light threshold current $I_{SL}$, the status code that is already determined is maintained at S42. Also when it is determined at S37 that the steering speed $d\theta$ is not lower than the threshold speed $d\theta_{TH}$, the status code that is already determined is maintained at S42.

Even where a plurality of phenomena are occurring in the steering device 14, the thus determined status code is the most highly ranked one of a plurality of status codes. At S43, information on the status code is transmitted to the operating ECU 60.

Figure 6:
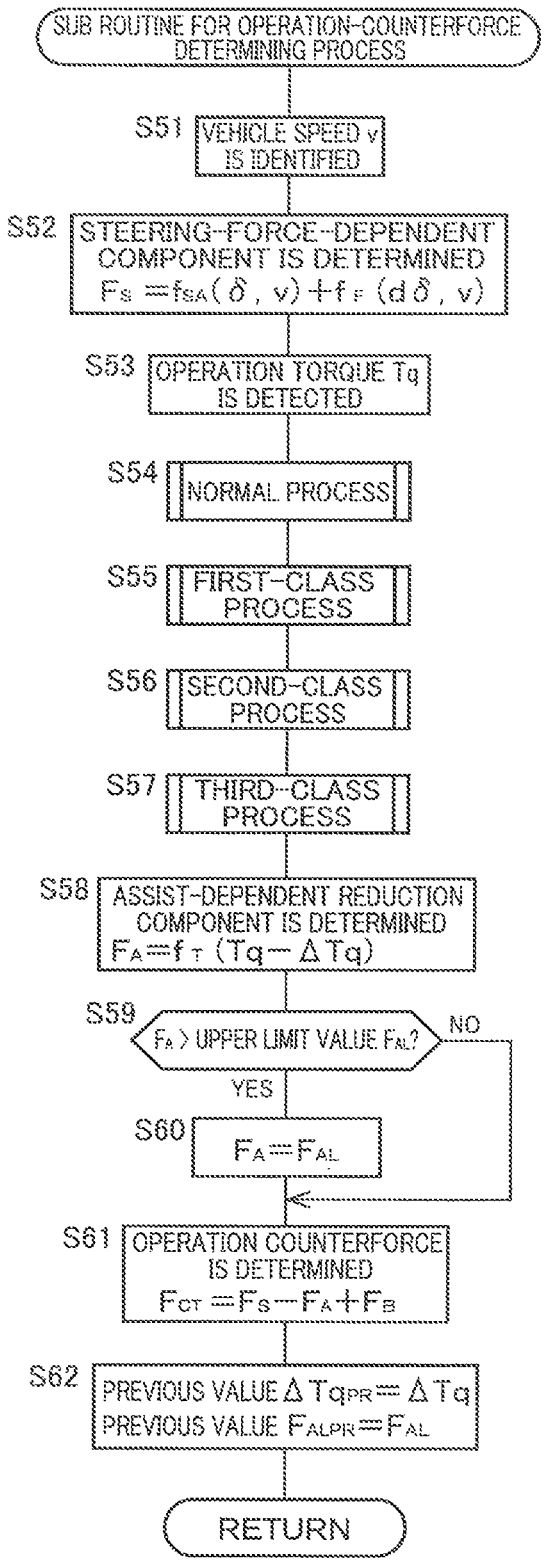
FIG. 6 is a flowchart representing a sub routine for an operation-counterforce determining process executed in the operation program.

The operation-counterforce determining process at S4 of the operation program is executed by executing a sub routine for the operation-counterforce determining process represented by a flowchart of FIG. 6. In the process according to the subroutine, the vehicle speed v is identified at S51 based on information transmitted from the brake ECU. At S52, the steering-force-dependent component $F_S$ is determined utilizing the self-aligning-dependent function $f_{SA}(\delta, v)$ and the road-surface-friction-dependent function $f_F(d\delta, v)$ as explained above. At S53, the operation torque Tq is detected via the operation torque sensor 34.

Each of subsequent steps, i.e., each of S54-S57, is a process based on the status code transmitted from the steering ECU 62. The normal process at S54 is executed by executing a sub routine for the normal process represented by a flowchart of FIG. 7. In the process according to the subroutine, it is determined at S541 whether the status code transmitted from the steering ECU 62 is "0". When the status code is "0", the control flow proceeds to S542 at which the reduction torque $\Delta Tq$ is made equal to 0, the upper limit of the assist-dependent reduction component $F_A$ is cancelled, and the obstacle-dependent component $F_B$ is determined to be 0. The cancellation of the upper limit of the assist-dependent reduction component $F_A$ is represented in the flowchart such that the upper limit value $F_{AL}$ of the assist-dependent reduction component $F_A$ is made equal to $\infty$. At S543, a maintaining flag FL (that will be later explained in detail) is reset to "0". When it is determined at S541 that the status code is not "0", S542 and S543 are skipped.

Figure 7:
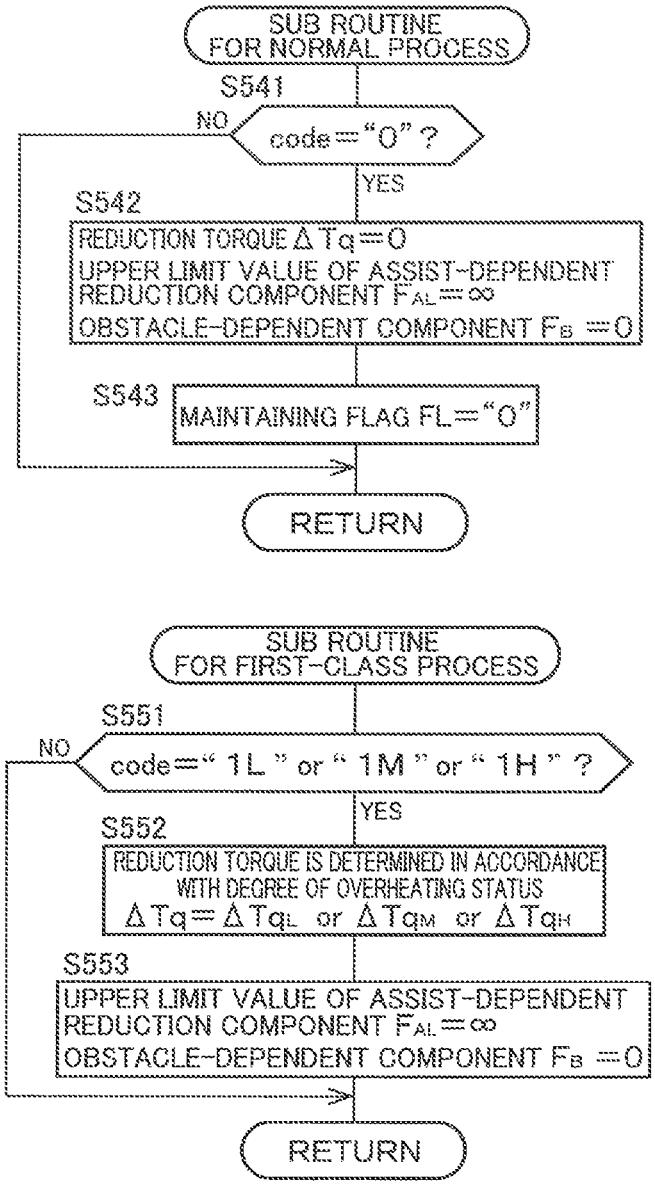
FIG. 7 is a flowchart representing a sub routine for a normal process and a flowchart representing a sub routine for a first-class process, both sub routines being executed in the sub routine for the operation-counterforce determining process.

The first-class process at S55 is executed by executing a sub routine for the first-class process represented by a flowchart of FIG. 7. In the process according to the subroutine, it is determined at S551 whether the status code transmitted from the steering ECU 62 is one of "1L", "1M", and "1H", namely, whether the transmitted status code is the status code indicating the overheating status. When the status code is one of "1L", "1M", and "1H", the reduction torque $\Delta T$ is determined at S552 in accordance with the degree of the overheating status as explained above. Specifically, when the degree of the overheating status is light, the reduction torque $\Delta T$ is determined to be the light-status torque $\Delta Tq_L$. When the degree of the overheating status is moderate, the reduction torque $\Delta T$ is determined to be the moderate-status torque $\Delta Tq_M$. When the degree of the overheating status is severe, the reduction torque $\Delta T$ is determined to be the severe-status torque $\Delta Tq_H$. At S553, the upper limit of the assist-dependent reduction component $F_A$ is cancelled, and the obstacle-dependent component $F_B$ is determined to be 0. When it is determined at S551 that the status code does not indicate the overheating status, S552 and S553 are skipped.

Figure 8:
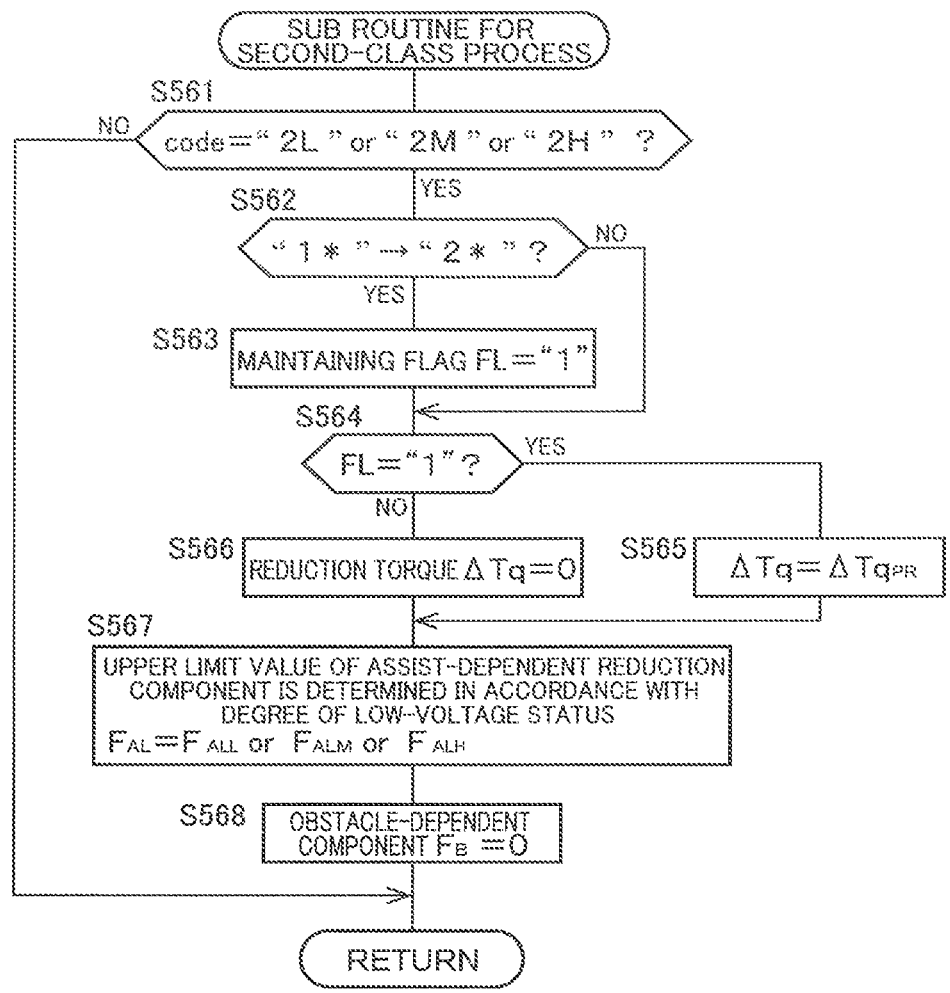
FIG. 8 is a flowchart representing a sub routine for a second-class process executed in the sub routine for the operation-counterforce determining process.

The second-class process at S56 is executed by executing a sub routine for the second-class process represented by a flowchart of FIG. 8. In the process according to the subroutine, it is determined at S561 whether the status code transmitted from the steering ECU 62 is one of "2L", "2M", and "2H", namely, whether the transmitted status code is the status code indicating the low-voltage status. When the status code is one of "2L", "2M", and "2H", it is determined at S562 whether the status code has changed, in the current process, from the status code that is ranked lower, namely, whether the status code has currently changed from the status code indicating the overheating status to the status code indicating the low-voltage status. When the status code has changed from the status code indicating the overheating status to the status code indicating the low-voltage status, the maintaining flag FL is set to "1" at S563. The maintaining flag FL is a flag whose initial value is "0". The maintaining flag FL is set to "1" when the reduction torque $\Delta Tq$ should maintain a value in previous execution of the program, i.e., the previous value $\Delta Tq_{PR}$ or when both the reduction torque $\Delta Tq$ and the upper limit value $F_{AL}$ of the assist-dependent reduction component $F_A$ should maintain respective values in previous execution of the program, i.e., the previous value $\Delta Tq_{PR}$ and the previous value $F_{ALPR}$. When the status code has not currently changed from the status code indicating the overheating status to the status code indicating the low-voltage status, S563 is skipped.

At S564, it is determined whether the maintaining flag FL is "1". When the maintaining flag FL is "1", the control flow proceeds to S565 at which the reduction torque $\Delta Tq$ is determined to be the previous value $\Delta Tq_{PR}$. When the maintaining flag FL is "0", the control flow proceeds to S566 at which the reduction torque $\Delta Tq$ is determined to be 0. At S567, the upper limit value $F_{AL}$ of the assist-dependent reduction component $F_A$ is determined in accordance with the degree of the low-voltage status as explained above. Specifically, when the degree of the low-voltage status is light, the upper limit value $F_{AL}$ is determined to be the light-status upper limit value $F_{ALL}$. When the degree of the low-voltage status is moderate, the upper limit value $F_{AL}$, is determined to be the moderate-status upper limit value $F_{ALM}$. When the degree of the low-voltage status is severe, the upper limit value $F_{AL}$ is determined to be the severe-status upper limit value $F_{ALH}$. At S568, the obstacle-dependent component $F_B$ is determined to be 0. When it is determined at S561 that the status code transmitted from the steering ECU 62 is not the status code indicating the low-voltage status, S562 and subsequent steps are skipped.

Figure 9:
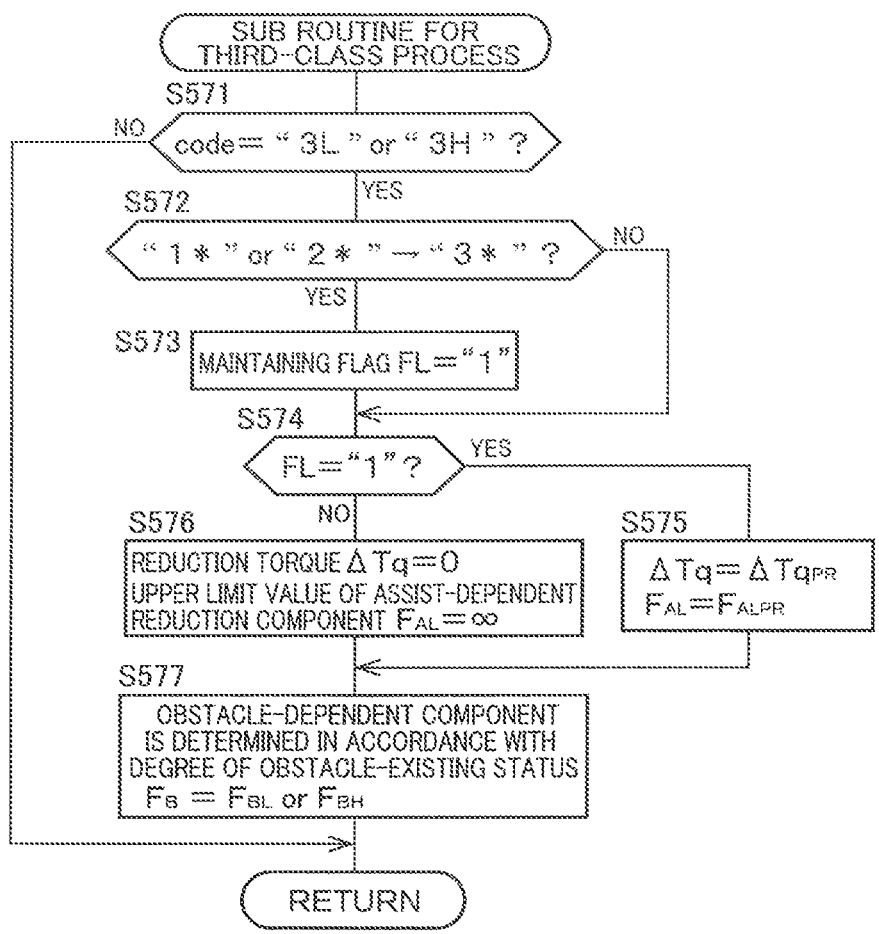
FIG. 9 is a flowchart representing a sub routine for a third-class process executed in the sub routine for the operation-counterforce determining process.

The third-class process at S57 is executed by executing a sub routine for the third-class process represented by a flowchart of FIG. 9. In the process according to the subroutine, it is determined at S571 whether the status code transmitted from the steering ECU 62 is one of "3L" and "3H", namely, whether the transmitted status code is the status code indicating the obstacle-existing status. When the status code is one of "3L" and "3H", the control flow proceeds to S572 at which it is determined whether the status code has changed in the current process, from the status code that is ranked lower, namely, whether the status code has currently changed from the status code indicating the overheating status or the low-voltage status to the status code indicating the obstacle-existing status. When the status code has changed from the status code indicating the overheating status or the low-voltage status to the status code indicating the obstacle-existing status, the maintaining flag FL is set to "1" at S573. When the status code has not currently changed from the status code indicating the overheating status or the low-voltage status to the status code indicating the obstacle-existing status, S573 is skipped.

Subsequently, it is determined at S574 whether the maintaining flag FL is "1". When the maintaining flag FL is "1", the control flow proceeds to S575 at which the reduction torque $\Delta Tq$ and the upper limit value $F_{AL}$ of the assist-dependent reduction component $F_A$ are determined to be the previous value $\Delta Tq_{PR}$ and the previous value $F_{ALPR}$, respectively. When the maintaining flag FL is "0", the control flow proceeds to S576 at which the reduction torque $\Delta Tq$ is determined to be 0 and the upper limit of the assist-dependent reduction component $F_A$ is cancelled. At S577, the obstacle-dependent component $F_B$ is determined in accordance with the degree of the obstacle-existing status as explained above. Specifically, when the degree of the obstacle-existing status is light, the obstacle-dependent component $F_B$ is determined to be the light-status component $F_{BL}$. When the degree of the obstacle-existing status is severe, the obstacle-dependent component $F_B$ is determined to be the severe-status component $F_{BH}$. When it is determined at S571 that the status code transmitted from the steering ECU 62 is not the status code indicating the obstacle-existing status, S572 and subsequent steps are skipped.

In the process according to the sub routine for the operation-counterforce determining process represented by the flowchart of FIG. 6, S57 at which the third-class process is executed is followed by S58 at which the assist-dependent reduction component $F_A$ is determined utilizing the assist function $f_T(Tq-\Delta Tq)$ as explained above. At S59, it is determined whether the assist-dependent reduction component $F_A$ is larger than the upper limit value $F_{AL}$. When the assist-dependent reduction component $F_A$ is larger than the upper limit value $F_{AL}$, the assist-dependent reduction component $F_A$ is determined to be the upper limit value $F_{AL}$ at S60.

At S61, the operation counterforce $F_{CT}$ is determined by adding the obstacle-dependent component $F_B$ to a value obtained by subtracting the assist-dependent reduction component $F_A$ from the steering-force-dependent component $F_S$. At S62, the reduction torque $\Delta Tq$ and the upper limit value $F_{AL}$ of the assist-dependent reduction component $F_A$ that are currently determined are stored respectively as the previous value $\Delta Tq_{PR}$ and the previous value $F_{ALPR}$ to be utilized in next execution of the program.

What is claimed is:

1. A steer-by-wire steering system for a vehicle, comprising:
an operating device including a steering operating member operable by a driver, a counterforce applying mechanism configured to apply, to the steering operating member, an operation counterforce by a counterforce motor, and an operating controller configured to control the operation counterforce;
a steering device including a steering actuator configured to steer a wheel by a steering motor and a steering controller configured to control an amount of steering of the wheel by the steering actuator; and
a communication line communicably connecting the operating controller and the steering controller,
wherein the steering controller is configured to:
determine a status code based on a status of the steering device, wherein the status code is ranked according to a degree of a phenomenon that occurs in the steering device, and the degree of the phenomenon comprises at least three degrees of severity, wherein the phenomenon comprises an overheating phenomenon of the steering motor, a low-voltage phenomenon in which a voltage applied from a drive source to a drive circuit for the steering motor is dropped, and an obstacle-existing phenomenon in which the steering of the wheel is obstructed by an obstacle such as a ditch or a curb; and
transmit the status code to the operating controller via the communication line; and
wherein the operating controller is configured to change a magnitude of the operation counterforce in accordance with the status code received by the operating controller, and an amount of the changed magnitude corresponds to a severity of the degree of the phenomenon among the at least three degrees of severity.

2. The steer-by-sire steering system according to claim 1, wherein the status code is classified in accordance with the phenomenon that occurs in the steering device.

3. The steer-by-wire steering system according to claim 2, wherein the status code is ranked according to a type of the phenomenon.

4. The steer-by-wire steering system according to claim 3, wherein, even if a plurality of status codes, each as the status code, are transmittable, the steering controller transmits only the most highly ranked one of the plurality of status codes.

5. The steer-by wire steering system according to claim 4, wherein, when the status code transmitted by the steering controller changes such that ranking of the status code rises, the operating controller changes the magnitude of the operation counterforce such that an amount of change in the operation counterforce based on the status code after changing is added to an amount of change in the operation counterforce based on the status code before changing.

* * * * *